United States Patent [19]
Dimitracopoulos

[11] 3,964,188
[45] June 22, 1976

[54] AUDIOVISUAL BOOK SYSTEM

[76] Inventor: Panayotis C. Dimitracopoulos, Lyford Cay, P.O. Box N-7776, Nassau, Bahamas

[22] Filed: Mar. 14, 1975

[21] Appl. No.: 556,321

[52] U.S. Cl................................. 40/28.1; 35/8 A; 274/42 P; 360/2
[51] Int. Cl.² ........................................ G09F 27/00
[58] Field of Search............ 35/8 A, 9 E, 9 F, 35 C; 40/28.1, 359, 360; 274/42 P; 360/2

[56] References Cited
UNITED STATES PATENTS

| | | | |
|---|---|---|---|
| 2,822,425 | 2/1958 | Hicks | 35/8 A X |
| 3,185,776 | 5/1965 | Bender | 35/35 C UX |
| 3,659,357 | 5/1972 | Martinesco et al. | 35/35 C |
| 3,767,208 | 10/1973 | Chernowitz | 35/35 C X |

FOREIGN PATENTS OR APPLICATIONS

| | | | |
|---|---|---|---|
| 824,031 | 11/1937 | France | 35/35 E |

*Primary Examiner*—William H. Grieb

[57] ABSTRACT

An audiovisual book system comprising an audiovisual apparatus accepting a book containing audiovisual pages, each page having an image and a sound track disposed near one of its edges and also having elongated perforations passing through binder means disposed in the book; individual pages, while they are retained and guided by the elongated perforations, are sequentially displaced, from their nesting position in the book, to a playing position, in which the sound track protrudes beyond one edge of the book and is thus exposed to a moving transducer in the apparatus, which scans the sound track arranged in the apparatus for scanning the sound track.

In an alternative embodiment, the audiovisual book contains audiovisual sheets having two consecutive edges defining between them a missing area and an information track disposed about an axis which intersects this missing area.

10 Claims, 9 Drawing Figures

U.S. Patent June 22, 1976 3,964,188
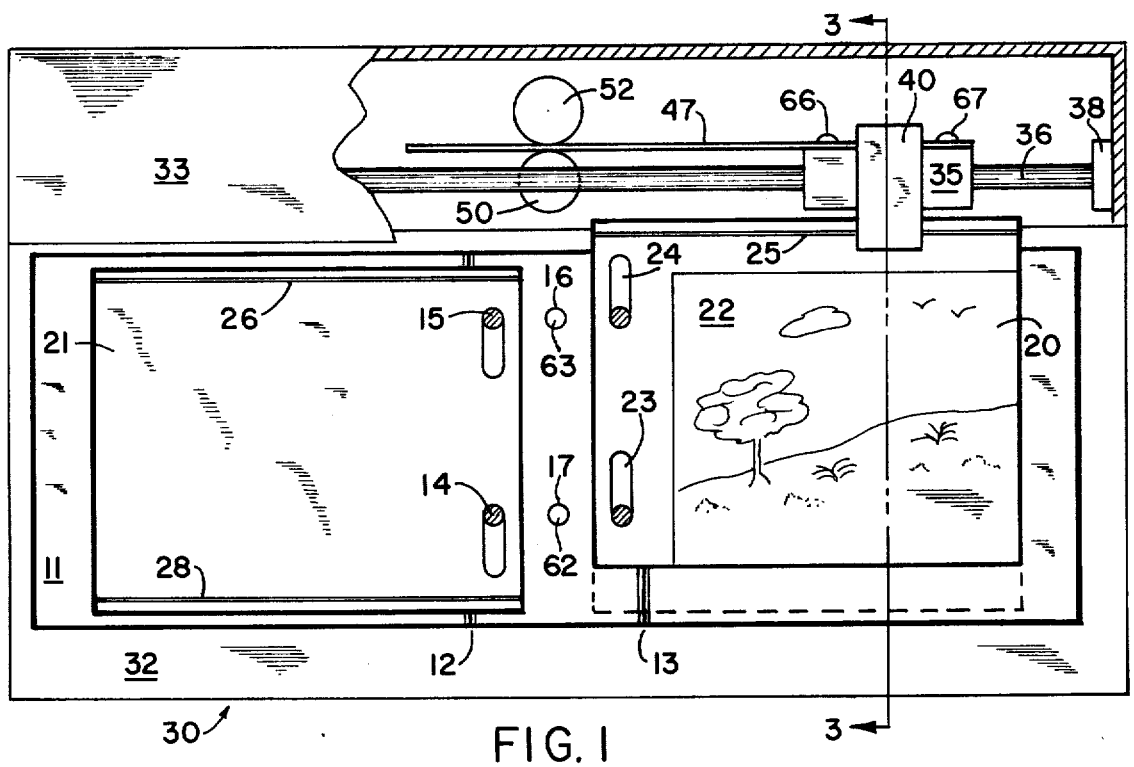
FIG. 1
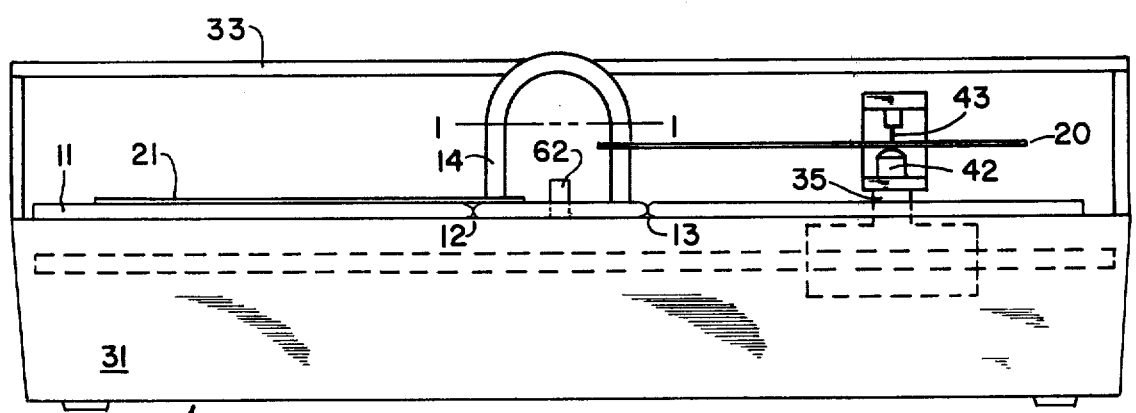
FIG. 2
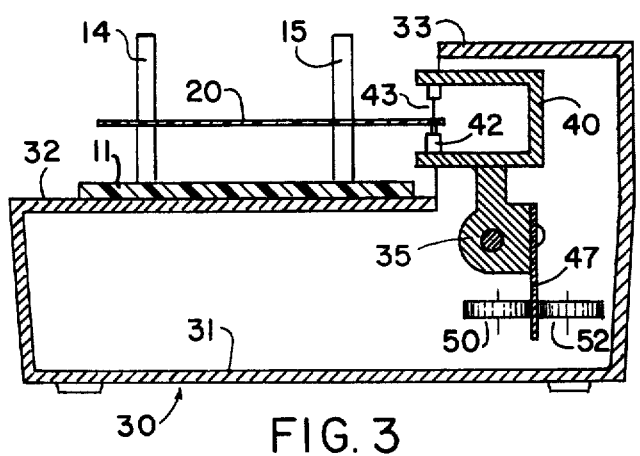
FIG. 3
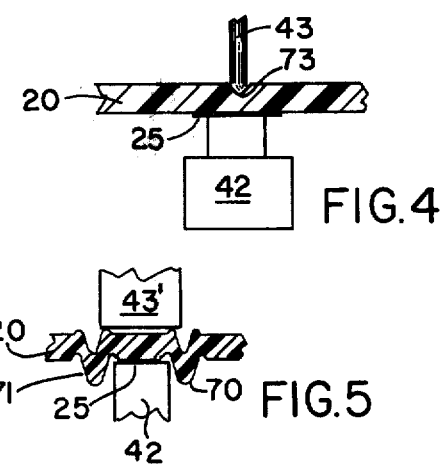
FIG. 4
FIG. 5

AUDIOVISUAL BOOK SYSTEM

FIELD OF INVENTION

This invention relates to audiovisual books, audiovisual albums, audiovisual pages and apparatuses therefor. Generally, this invention relates to novel audiovisual book systems.

BACKGROUND OF THE INVENTION

While picture and sound synchronization was realized a long time ago in the motion pictures industry, a practical system for achieving the same result was not available in the projectable transparencies field until the inventor of the present invention taught simple and efficient methods for integrating sound with slides. He did so in inventions such as those he disclosed in U.S. Pat. Nos. 3,122,053 3,122,054 3,282,154 3,302,520 3,480,356 3,644,032 3,717,407 3,730,618 3,825,332, and others.

Methods for adding sound to images, or printed pages, have been proposed since the turn of the century and usually consist of linear or spiral sound tracks disposed on the same, or the opposite pages of sheets carrying visual information. The problem is that each such audiovisual sheet must be separately inserted in the appropriate apparatus and this is not only impractical, but the sheets may easily be misled, intermixed and generally their sequence lost.

The problem is not much different from that encountered in simple photography or, for that matter, in the field of printed intelligence. Printed sheets, are bound in volumes and photographs are mounted in albums for convenience and also to preserve the necessary sequence.

The instant invention solves these problems by disclosing simple and convenient audiovisual books and audiovisual albums as well as novel audiovisual sheets and apparatuses employed therewith.

BRIEF DESCRIPTION OF THE FIGURES

FIG. 1 is a partly sectional top view of an apparatus, album and audiovisual sheets or pages according to the invention.

FIG. 2 is a front elevation of the audiovisual system of FIG. 1.

FIG. 3 is a sectional view along line 3—3 of FIG. 1.

FIGS. 4 and 5 are sectional, fragmentary, views of alternative embodiments of audiovisual sheets according to the invention, illustrating positive tracking arrangements of transducers on intelligence tracks disposed on these audiovisual sheets.

DETAILED DESCRIPTION

Figure 6:
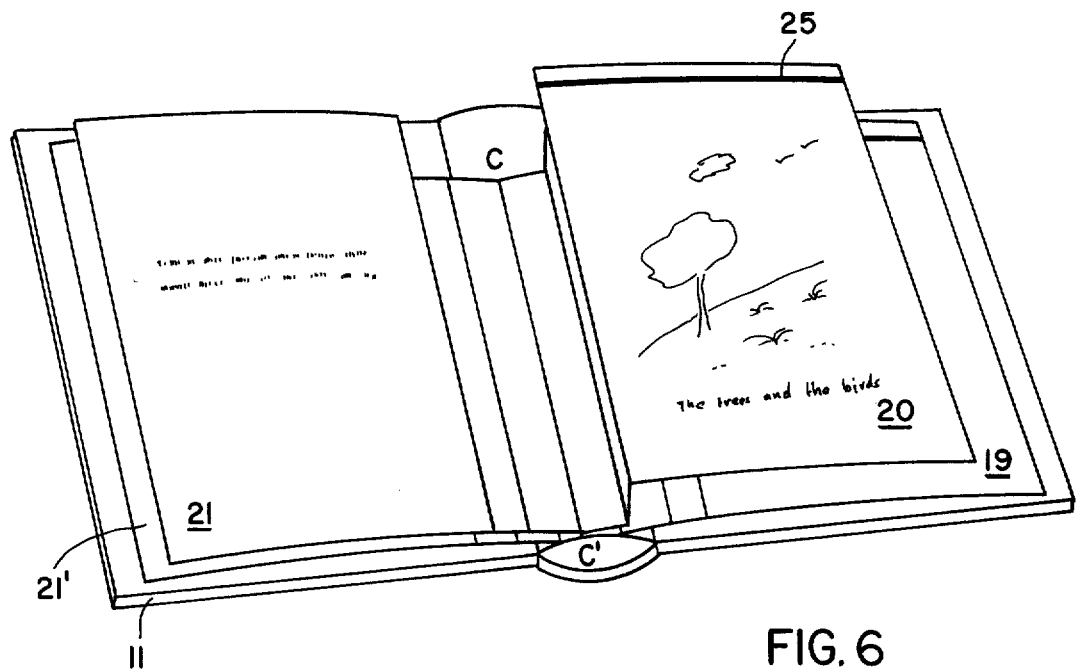
FIG. 6 is a perspective view of an alternative embodiment of an audiovisual book according to the invention.

The invention teaches a novel audiovisual system consisting of essentially three parts or components which, when considered as a whole, constitute this novel audiovisual system. They are:

The Audiovisual Sheet or Page
The Audiovisual Album or Book
The Audiovisual Apparatus.

I. THE AUDIOVISUAL SHEET OR PAGE

The audiovisual page, or generally the audiovisual sheet, consists of a paper, plastic, etc., sheet, having visual information and sound and/or intelligence track(s). Each sheet or page is formed with elongated holes or perforations, adapted to bind it — in a special manner — to the book or album of the invention.

Each audiovisual sheet or page is adapted to have the visual information written, inscribed, drawn, printed or otherwise disposed thereon. For example, a photograph (or other visual information) may be adhesively, or in any other manner, disposed on such audiovisual sheet.

An audiovisual sheet or page according to the invention may, for example, consist of a substantially retangular sheet 20, having an image area 22 and a sound and/or intelligence track, such as tracks 25 and 26. The intelligence track is disposed substantially near one of the edges of the audiovisual sheet or page on the same or opposite side of the image. The sound and/or intelligence track may be of any convenient or desirable type, including, but not limited to, the wellknown phonographic, magnetic, etc. Transducer-guiding means, such as grooves or the like, may also be arranged integrally with, or separately from, the track.

The audiovisual sheet is perforated close to one edge substantially in the well-known loose-leaf fashion, except that each perforation is of an elongated form for reasons that will become apparent later. Such elongated perforations may be of any convenient number, shape and size, for example as designated by numerals 23 and 24 in FIG. 1.

II. THE AUDIOVISUAL ALBUM OR BOOK

The audiovisual book or album may be generally of the loose-leaf binder type and may have the usual folds 12 and 13 along which it may be folded in book fashion. It also has binder means, such as ring-binders of any convenient shape, size or crossection, for example two ring-binders 14 and 15. Ring binder 14 is shown in elevation in FIG. 2, while in FIG. 1 the two ring-binders 14 and 15 are shown cut-away along line 1 — 1 of FIG. 2, to facilitate the ensuing description.

The book or album of the invention may also have two holes 16 and 17 employed to properly align it on the audiovisual apparatus to be described later.

FIG. 1 illustrates an opened album which, to simplify the description, is shown as carrying only two audiovisual sheets or pages, namely sheets 20 and 21. It will be observed that due to the elongated perforations 23 and 24, each sheet or page may nest within the boundaries of the album, for example as shown by sheet 21 on the left side of FIG. 1, or may be displaced so that its edge which carries the intelligence track exceeds beyond the album, as is the case with sheet 20 on the right side of FIG. 1. This sheet 20 would nest within the album boundaries if displaced towards the lower end of FIG.

1, in which case its lower part will assume the position shown in dotted lines.

III. THE AUDIOVISUAL APPARATUS

Numeral 30 generally designates the apparatus, which consists of a lower housing 31 having a substantially flat upper surface 32 and, optionally, a raised upper housing 33.

An opened album 11 is properly aligned on the upper surface 32 by means of upstanding pins or posts 62 and 63 which are secured on, and protrude over, this upper surface 32, and which snugly pass through the abovedescribed holes 16 and 17 of the album.

A transducer is arranged to move linearly so that it may scan the intelligence track of the audiovisual sheet. Such a motion may be obtained in several ways and one will be described as an example. The transducer, for example magnetic transducer 42, is mounted on transducer bracket 40, which is, in turn, secured on transducer carriage 35. Transducer carriage 35 is slidably supported on rail or shaft 36 which is fixedly secured to the frame, or the housing, of the apparatus, for example by means of flange or bracket 38 and a similar flange or bracket (not shown) at the other end of the shaft. It is necessary to inpart a smooth motion to the transducer carriage 35 and this may be done in any number of ways, including lead-screws, endless belts or lines, various mechanical and hydraulic means etc. For example, a simple way is the following: one end of a thin metal or plastic strip 47 is secured on carriage 35 by any convenient means, such as screws or rivets 66 and 67 (FIG. 1), while its other end is "pinched" between two rollers or wheels 50 and 52, one of which is rotationally driven by means of pulleys, belts, gears, motors, etc. (not shown). In this way, as the wheels 50 and 52 rotate, they engage and move strip 47 and thereby smoothly move transducer carriage 35 over the rail or shaft 36. In so doing, the transducer will move along the intelligence track and scan the information contained therein. As it was previously disclosed, the intelligence track may be on the side that carries the visual information or the opposite side and accordingly, the transducer 42 will move below or above the audiovisual sheet as required. Assuming that the intelligence track is on the opposite side from the visual information, the transducer will move below the audiovisual sheet, as shown in the illustrations. Since it is preferable (but not absolutely necessary) to provide positive guidance to the transducer, a guiding groove, or track, on the audiovisual sheet is desirable. Of course, if a phonographic track is employed, such track is integrally formed with a guiding groove. However if a magnetic track is utilized, it is very convenient to provide transducer guiding means in the form of a groove or the like, for example as shown in FIGS. 4 and 5. FIG. 4 shows a crosssectional segment of sheet 20, which has a magnetic track 25 and a guiding groove 73 disposed on opposite sides. A stylus 43 may engage in this groove 73 and thereby guide the transducer 42. For best results, the stylus 43 and the transducer 42 may be mounted on a U-shaped bracket, such as bracket 40 illustrated in FIG. 3. Alternatively, a "grooved" magnetic track may be employed, for example the arrangement illustrated in FIG. 5, where audiovisual sheet 20 carries a magnetic track 25 having two raised guiding walls 70 and 71 between which the transducer 42 may be guided. For positive tracking it is recommended to press the sheet 20 against the transducer 42 by means of a small pad 43', such pad 43' being disposed on a U-shaped bracket similar to that previously described, that is, in the arrangement of FIG. 3, the stylus 43 is replaced by the small pad 43' of FIG. 5.

Further information regarding intelligence tracks and transducers guiding means may be obtained from U.S. Pat. Nos. 3,408,080, 3,627,330, 3,717,407, and 3,730,618 by the same inventor and therefore it is not deemed necessary to deal with these matters in the present description. The operation is as follows: The transducer carriage 35 is manually, or otherwise, displaced to the beginning of its travel, for example all the way to the right. An audiovisual sheet 20 is pushed towards the transducer (and if necessary slightly lifted) in order to place it in a position where its sound track may be readily engaged by the transducer. The transducer carriage 35 is then set in motion so that the transducer may engage and scan the sound track, while the visual information is being observed. After the transducer has completed its travel, the audiovisual sheet is pulled back, being guided by binder rings 14 and 15, and flipped over to the position shown by sheet 21, thus exposing another sheet and the operation is repeated, sheet after sheet, as desired.

NOTES AND REMARKS

While an embodiment of the novel audiovisual system was described above, it must be emphasized that such embodiment was only disclosed and illustrated as an example and any number of modifications and variations may be made by those skilled in the art and, accordingly, it is not intended to exclude any such modifications and variations which properly fall within the scope of this invention, for example: The audiovisual sheets may be made of any appropriate material and have any desired shape and size. They may also be constituted, or be composed, of any number of layers, for example, a single layer may carry the visual information and the intelligence track, or a blank sheet may carry the intelligence track and may be adapted to adhesively or otherwise receive the visual information, which may, in turn, be an image, a photograph, printed information such as printed words and the like, or any other combination of desirable, visually recognizable and/or reproduceable information.

As previously stated, the intelligence track may be of any type, such as phonographic, magnetic, etc., and may contain any desirable information such as sound, pulses, command signals etc. If so desired, more than one track may be placed parallel to one another, on the same, or opposite, sides of the audiovisual sheets. Likewise, guiding tracks may be arranged as desired.

Visual images may be disposed on one, or both, sides of the audiovisual sheets and, if desired, intelligence tracks may be disposed near more than one edges, such as optional intelligence track 28, so that once all the sheets contained in an album have been viewed and heard, the album is turned upside down and the images disposed on the opposite pages are viewed while the associated sound track is listened to. In such a case holes 23 and 24 will be even more elongated to allow greater movement (in both directions) of the audiovisual sheets.

The number, size, shape and location of holes 23 and 24 will be as desired and may be, optionally, reinforced by eyelets or other similar or equivalent reinforcements. The number, size, shape and location of binder rings 14 and 15 will also be as desired or convenient and, generally, other types of page-binding means may be employed in the albums or books for holding the pages. The number, shape, size and location of alignment pins 62 and 63 and corresponding holes 16 and 17 will also be as desired. The album size and shape will also be as desired.

The size and shape of the apparatus and the disposition of parts and components thereon will be as desired. The disposition of the album on the apparatus will be as desired and the plane of viewing of each sheet may be essentially horizontal, as shown in the Figures, or may be inclined to any angle.

The disposition and movement of the transducer will not be limited to the one abovedescribed but may vary, as desired or as dictated by design, economics and human engineering considerations.

As previously mentioned, the present invention is not only very useful for adding sound and/or other signal information to images and photographs, but is equally well useful in that it provides a simple, convenient and practical method for adding sound and/or signal information to all kinds of book-type devices and arrangements, including technical manuals, advertising and promotional brochures, teaching and educational documents, entertaining books, and any and all types and forms of book-type devices and products.

ALTERNATIVE EMBODIMENT OF AUDIOVISUAL BOOK SYSTEM

As a further example of the variations and modifications abovereferred to, the following embodiment of an audiovisual book system will be described in conjunction with FIGS. 6, 7, 8 and 9, same numerals always designating similar parts and components.

Figure 7:
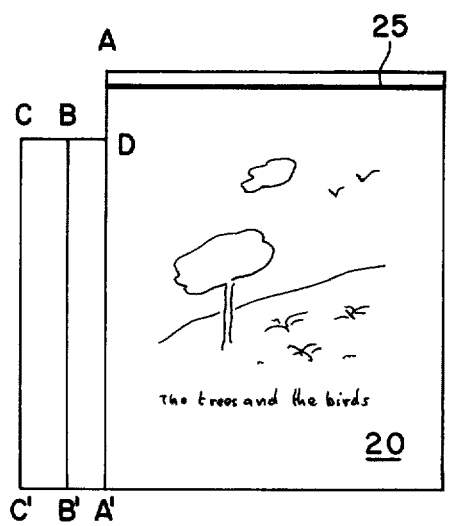
FIG. 7 illustrates a single page from the book shown in FIG. 6, before such page is bent or folded.
Figure 9:
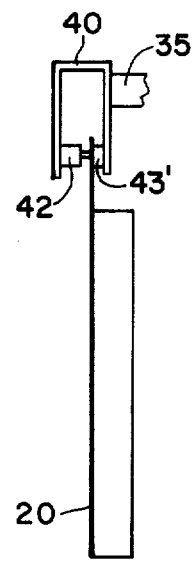
FIG. 9 is a side elevation of the page shown in FIG. 7, after such page is bent in preparation of the scanning of its track, in addition illustrating the manner in which the sound track may be engaged and scanned by a transducer.
Figure 8:
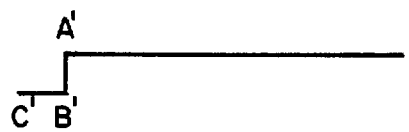
FIG. 8 is a front elevation of the page shown in FIG. 7, after such page is bent in preparation of the scanning of its track.

FIG. 6 is a perceptive view of such alternative embodiment of an audiovisual book, illustrated with its cover 11 opened-up, exposing sheets 19, 20, 21, and 21' (of course, fewer or more sheets will be present, as desired). These sheets may be bound in the book in any convenient, conventional, or desired manner, for example, along line C—C'. Each sheet has folds, such as folds along lines B—B' and A—A', or is marked, or indented, etc., along lines such as B—B' and A—A' (as shown in FIG. 7 which illustrates a sheet before it is folded), so that it may be conveniently folded along these lines, as shown in FIGS. 6, 8 and 9.

The sound and/or information track, or tracks, i.e., at least one sound and/or information track, is disposed parallel to, and at a small distance away from one edge, such track being again designated by numeral 25, and being on the same, or opposite, side of the face of the sheet which carries the visual information.

Each sheet is notched or otherwise formed, so that the sound and/or information track protrudes beyond the binding line C—C'. This may be accomplished in several ways, for example, by cutting-out or forming the corner of the sheet which is near the binding line C—C' approximately as shown in FIG. 7. In this example, it can be seen that the main surface of the sheet, i.e. the free surface lying beyond line A—A', has a length A—A' which is longer than the length of the sheet along the binding line C—C'. Therefore, when a sheet such as sheet 20, is folded along lines A—A' and B—B', it takes the shape shown in FIGS. 6, 8 and 9, and when so folded, its sound and/or information track will freely protrude beyond any other sheet in the book 11, and it may thus be conveniently exposed to be engaged and scanned by an appropriate transducer, for example as shown in FIG. 9. In this FIG. 9, the edge of sheet 20, which carries the track 25 is "pinched" between the transducer 42 and pad 43', both carried on opposite legs of U-shaped bracket 40. This bracket 40 may, again, be conveniently disposed on carriage 35, shown broken away in FIG. 9. The types of tracks, types and arrangements of transducers, scanning apparatus, etc. having been previously described in connection with FIGS. 1 to 5, need no further elaboration, and it will be understood that all the arrangements and devices described in connection with FIGS. 1 to 5, as well as the NOTES AND REMARKS that follow, apply equally well to the audiovisual book system described in connection with FIGS. 6 to 9 and, in addition, it must be further emphasized that the form and type of the sheet 20, the type, shape, contour and form of the cut-out next to the track 25, the type, number and form of the folds (such as B—B' and A—A'), may vary as desired, and/or as it becomes convenient, and/or as dictated by particular design considerations. For example, the portion of the sheet CC'B'B may be eliminated and the binding line moved along line B—B', in which case, one fold such as along line A—A' may very well suffice. Generally, folds such as B — B' and A — A', while desirable in most cases, are not absolutely essential because the flexibility of the sheet itself may suffice. However, the notch or cut-out next to the information track and near the binding edge of the sheet (i.e. a notch generally similar to cut-out ADC of FIG. 7), is a rather desirable feature.

What is claimed is:
1. An audiovisual book including:
   a. book-cover means substantially similar to a loose-leaf binder;
   b. at least one audiovisual sheet having an area wherein visual information may be placed and an audio information track disposed about a linear axis, said sheet also having at least one elongated perforation, said elongated perforation having a lengthwise axis substantially perpendicular to said linear axis;
   c. binder means on said book-cover means passing through said elongated perforation retaining said sheet but also allowing it to be displaced along said lengthwise axis.

2. An audiovisual book according to claim 1 having registration means disposed on said book-cover means, said registration means employable for positioning said book in an apparatus which accepts said book for audio reproduction.

3. An audiovisual sheet of substantially rectangular shape having four principal edges, namely a first, second, third and fourth consecutive edges;
   the corner area between said first and second consecutive edges being missing;
   said sheet having an audio information track arranged about an axis parallel to said second edge and intersecting said corner area;
   said sheet carrying visually recognizable information thereon;
   said sheet having means along said first edge for binding said sheet in a book.

4. An audiovisual sheet according to claim 3 having at least one fold parallel to said first edge.

5. An audiovisual sheet having two consecutive edges defining between them a missing corner area;
   said sheet having an area where visually recognizable information may be arranged;

said sheet having an audio information track disposed about an axis which intersects said corner area;

said sheet having means along one of said two edges for binding said sheet in a book.

6. An audiovisual sheet accoring to claim 5 having at least one fold substantially perpendicular to said axis.

7. An audiovisual book including book-cover means and audiovisual sheets bound in said book-cover means, each of said sheets having two consecutive edges defining between them a missing corner area, each of said sheets having an area where visually recognizable information may be arranged, each of said sheets having an information track disposed about an axis which intersects said corner area, one of said edges being the edge along which each of said sheets is bound in said book-cover means.

8. An audiovisual book according to claim 7 having registration means disposed on said book-cover means, said registration means employed for aligning said book in an apparatus accepting said book for audio reproduction.

9. An audiovisual book system including:
an audiovisual sheet
book-cover means
an audiovisual apparatus a. said sheet having visually recognizable information thereon and an audio intelligence track linearly disposed at a small distance away from one of its edges, said sheet also having at least one elongated perforation, said perforation having a lengthwise axis substantially perpendicular to said track, b. said book-cover means having binder means passing through said elongated perforation thereby retaining said sheet in said book-cover means but allowing said sheet to be displaced along said lengthwise axis, c. said audiovisual apparatus having support means receiving said book-cover means and locating means aligning said book-cover means on said support means and a transducer slidably supported in said apparatus engaging and following said track in an information-scanning relation.

10. An audiovisual book system according to claim 9 wherein said binder means passing through said elongated perforation retain said sheet in a nesting position in said book-cover means but also allow said sheet to be displaced along said lengthwise axis thus placing it in a working position in which said track protrudes beyond said book-cover means and is thereby exposed to be engaged by said transducer.

* * * * *